United States Patent
Jones

(10) Patent No.: US 8,738,284 B1
(45) Date of Patent: May 27, 2014

(54) METHOD, SYSTEM, AND COMPUTER PROGRAM PRODUCT FOR DYNAMICALLY RENDERING TRANSIT MAPS

(75) Inventor: Jonah Jones, Sydney (AU)

(73) Assignee: Google Inc., Mountain View, CA (US)

( * ) Notice: Subject to any disclaimer, the term of this patent is extended or adjusted under 35 U.S.C. 154(b) by 401 days.

(21) Appl. No.: 13/271,842

(22) Filed: Oct. 12, 2011

(51) Int. Cl.
*G01C 21/00* (2006.01)

(52) U.S. Cl.
USPC ........................................................ 701/409

(58) Field of Classification Search
CPC .......... G01C 21/00; G01C 21/36; G01C 21/34
USPC .......... 701/400, 409, 412, 417, 438, 527, 533
See application file for complete search history.

(56) References Cited

U.S. PATENT DOCUMENTS

| | | |
|---|---|---|
| 5,243,528 A | 9/1993 | Lefebvre |
| 6,067,502 A | 5/2000 | Hayashida et al. |
| 6,812,888 B2 | 11/2004 | Drury et al. |
| 6,973,318 B2 | 12/2005 | Jambhekar et al. |
| 7,206,837 B2 | 4/2007 | Seligmann |
| 7,395,149 B2 | 7/2008 | Matsumoto et al. |
| 7,444,237 B2 | 10/2008 | Dale |
| 7,822,491 B2 | 10/2010 | Howlett et al. |
| 7,840,579 B2 | 11/2010 | Samuelson et al. |
| 7,865,306 B2 | 1/2011 | Mays |
| 7,937,394 B2 | 5/2011 | Venkataraman et al. |
| 2004/0218894 A1 | 11/2004 | Harville et al. |
| 2007/0078599 A1 | 4/2007 | Yoshioka et al. |
| 2007/0106468 A1 | 5/2007 | Eichenbaum et al. |
| 2008/0052638 A1 | 2/2008 | Frank et al. |
| 2008/0097731 A1 | 4/2008 | Lanes et al. |
| 2008/0300778 A1 | 12/2008 | Kuznetsov |
| 2008/0312819 A1 | 12/2008 | Banerjee |
| 2009/0140887 A1 | 6/2009 | Breed et al. |
| 2009/0240431 A1 | 9/2009 | Chau et al. |
| 2009/0276118 A1 | 11/2009 | Shen et al. |
| 2009/0310325 A1 | 12/2009 | Wong |

(Continued)

FOREIGN PATENT DOCUMENTS

| | | |
|---|---|---|
| JP | 2005114695 A | 4/2005 |
| KR | 2010097238 A | 9/2010 |

(Continued)

OTHER PUBLICATIONS

Arikawa, Masatoshi, et al., "NAVITIME: Supporting Pedestrian Navigation in the Real World", IEEE, Jul.-Sep. 2007, pp. 21-29.

(Continued)

*Primary Examiner* — Kim T Nguyen
(74) *Attorney, Agent, or Firm* — Dority & Manning, P.A.

(57) ABSTRACT

Systems, methods, computer programs, and user interfaces are provided to obtain a number of transit route features, perform a spatial comparison of a first transit route feature of the transit route features with a road spatial data layer, modify a transit location of the first transit route feature to intersect a road feature of the road spatial data layer based on the spatial comparison, obtain a road layer style for the road spatial data layer, determine a transit layer style for the first transit route feature based on the road layer style, and generate, based on the transit layer style, a transit map such that a transit label for the first transit route feature is contained by the road feature.

21 Claims, 8 Drawing Sheets

(56) References Cited

U.S. PATENT DOCUMENTS

| | | | |
|---|---|---|---|
| 2009/0325607 | A1 | 12/2009 | Conway et al. |
| 2010/0017112 | A1 | 1/2010 | Sim |
| 2010/0057336 | A1 | 3/2010 | Levine |
| 2010/0082820 | A1 | 4/2010 | Furukawa |
| 2010/0125410 | A1 | 5/2010 | Hicks |
| 2010/0161370 | A1 | 6/2010 | Bloom |
| 2010/0217513 | A1* | 8/2010 | Takeda .......................... 701/200 |
| 2010/0250115 | A1 | 9/2010 | Ohata et al. |
| 2010/0318285 | A1 | 12/2010 | Kim |
| 2011/0010241 | A1 | 1/2011 | Mays |
| 2011/0022313 | A1 | 1/2011 | Bugnariu |
| 2011/0060523 | A1 | 3/2011 | Baron |
| 2011/0087425 | A1* | 4/2011 | Deng et al. .................... 701/200 |
| 2011/0112717 | A1 | 5/2011 | Resner |
| 2011/0130950 | A1 | 6/2011 | Wexler et al. |
| 2011/0178697 | A1 | 7/2011 | Mincey et al. |
| 2011/0191017 | A1 | 8/2011 | Certin |
| 2012/0046861 | A1 | 2/2012 | Feldbauer |
| 2012/0053830 | A1* | 3/2012 | Bach ............................ 701/438 |
| 2012/0173137 | A1 | 7/2012 | Compton et al. |

FOREIGN PATENT DOCUMENTS

| | | |
|---|---|---|
| WO | WO9204683 A | 9/1990 |
| WO | WO2004114592 A1 | 12/2004 |
| WO | WO2009046134 A1 | 4/2009 |

OTHER PUBLICATIONS

An expert system for tourists using Google Maps API; Pejic, A.; Pletl, S.; Pejic, B.; Intelligent Systems and Informatics, 2009. SISY '09. 7th International Symposium on; Digital Object Identifier: 10.11 09/SISY.2009.5291141 ; Publication Year: 2009, pp. 317-322.

Integrated Google Maps and smooth street view videos for route planning; Chi Peng; Bing-Yu Chen; Chi-Hung Tsai; Computer Symposium (ICS), 2010 International; Digital Object Identifier: 10.11 09/COMPSYM.201 0.5685494; Publication Year: 2010, pp. 319-324.

Integration of nomadic devices with automotive user interfaces; Gil-Castineira, F.; Chaves-Dieguez, D.; Gonzalez-castano, F.J.; Consumer Electronics, I EEE Transactions on; vol. 55, Issue: 1; Digital Object Identifier: 10.11 09/TCE.2009.4814411; Publication Year: 2009, pp. 34-41.

Zekeng, Liang. "The USHER System to Generate Semantic Personalised Maps for Travellers", 2010. pp. 49-71.

Integrated Tourist Navigation System; Haomian Wang; Weiwei Cui; Hong Zhou; Yingcai Wu; Huamin Qu; Computer Graphics, Imaging and Visualization, 2009. CGIV '09. Sixth International Conference on; Digital Object Identifier: 10.1109/CGIV.2009.45; Publication Year: 2009, pp. 497-502.

Nautical and aeronautical electronic charting/navigation systems evelopments, similarities and differences; Theunissen, E.; De Groot, C.A.; Sabelis, H.; Koeners, G.J.M.; Digital Avionics Systems Conference, 2004. DASC 04. The 23rd ;vol. 1; Digital Object Identifier: 10.1109/DASC.2004.1391320; Pub. Year: 2004, p. 4.C.1-41-12 vol. 1.

Ragghubir, et al., "Spatial Categorization and Time Perception: Why Does it Take Less time to Get Home?", Journal of Consumer Psychology, Aug. 30, 2010.

IBM et al., "Method of Integrating Profile-Based Add-on Services for Generating Driving Directions", IP.COM, Oct. 29, 2007.

* cited by examiner

METHOD, SYSTEM, AND COMPUTER PROGRAM PRODUCT FOR DYNAMICALLY RENDERING TRANSIT MAPS

TECHNICAL FIELD

The present disclosure relates to a process for rendering transit maps. More specifically, embodiments of the present disclosure render transit maps having transit labels that are contained by road features.

BACKGROUND

Modern smart phones and navigation devices are typically equipped with mapping capabilities. For example, a user of these devices may use the mapping capabilities to locate a point of interest or to plan for a trip. In addition, smart phone and navigation devices may be equipped with global positioning system (GPS) capabilities. In this case, GPS may be used on these devices to obtain maps of the geographic area at the device's location. Once located, the device may be used to navigate (by driving, using public transportation, walking, etc.) to a destination specified by the user. Specifically, the device may provide turn-by-turn directions and track the progress of the user in real-time on a map by showing a current location of the user.

In the case of public transportation, mapping and navigation services typically rely on transit data supplied by the transit providers. Portions of the transit data may not be consistent with road features. Further, the transit data may be incomplete or lack interactive features useful for navigation.

SUMMARY

Various embodiments of systems, methods, computer programs, and user interfaces for dynamically rendering transit maps are described herein. In some aspects, provided are a system, method, computer program, and user interface for obtaining a number of transit route features, performing a spatial comparison of a first transit route feature of the transit route features with a road spatial data layer, modifying a transit location of the first transit route feature to intersect a road feature of the road spatial data layer based on the spatial comparison, obtaining a road layer style for the road spatial data layer, determining a transit layer style for the first transit route feature based on the road layer style, and generating, based on the transit layer style, a transit map such that a transit label for the first transit route feature is contained by the road feature.

In some aspects, the system, method, computer program, and user interface are further for determining a rank for each of the transit route features at the transit location based on a frequency of transit stops of each of the transit route features. In some aspects, the transit label includes a representation of the first transit route feature, the first transit route feature having a greater frequency of transit stops than a second transit route feature of the transit route features; and where the transit label excludes the second transit route feature. In some aspects, the transit label includes a first representation of the first transit route feature and a second representation of a second transit route feature of the transit route features, where the first representation is presented before the second representation in the transit label based on the first transit route feature having a greater frequency of transit stops than the second transit route feature.

In some aspects, the system, method, computer program, and user interface are further for receiving a request to filter the transit map, the request to filter including a selected transit route feature of the transit route features and updating the transit label to include a representation of the selected transit route feature and to exclude unselected transit route features of the transit route features.

In some aspects, the system, method, computer program, and user interface are further for receiving a request to filter the transit map, the request to filter including a selected time period for the transit location and updating the transit label to include a representation of a second transit route feature of the transit route features, the second transit route feature having a transit stop at the transit location within the selected time period and to exclude transit route features of the transit route features that do not have a transit stop at the transit location within the selected time period.

In some aspects, the road feature is represented in the transit map based on the transit layer style, and where a second road feature that does not intersect the transit route features is represented in the transit neap based on the road layer style.

Figure 1:
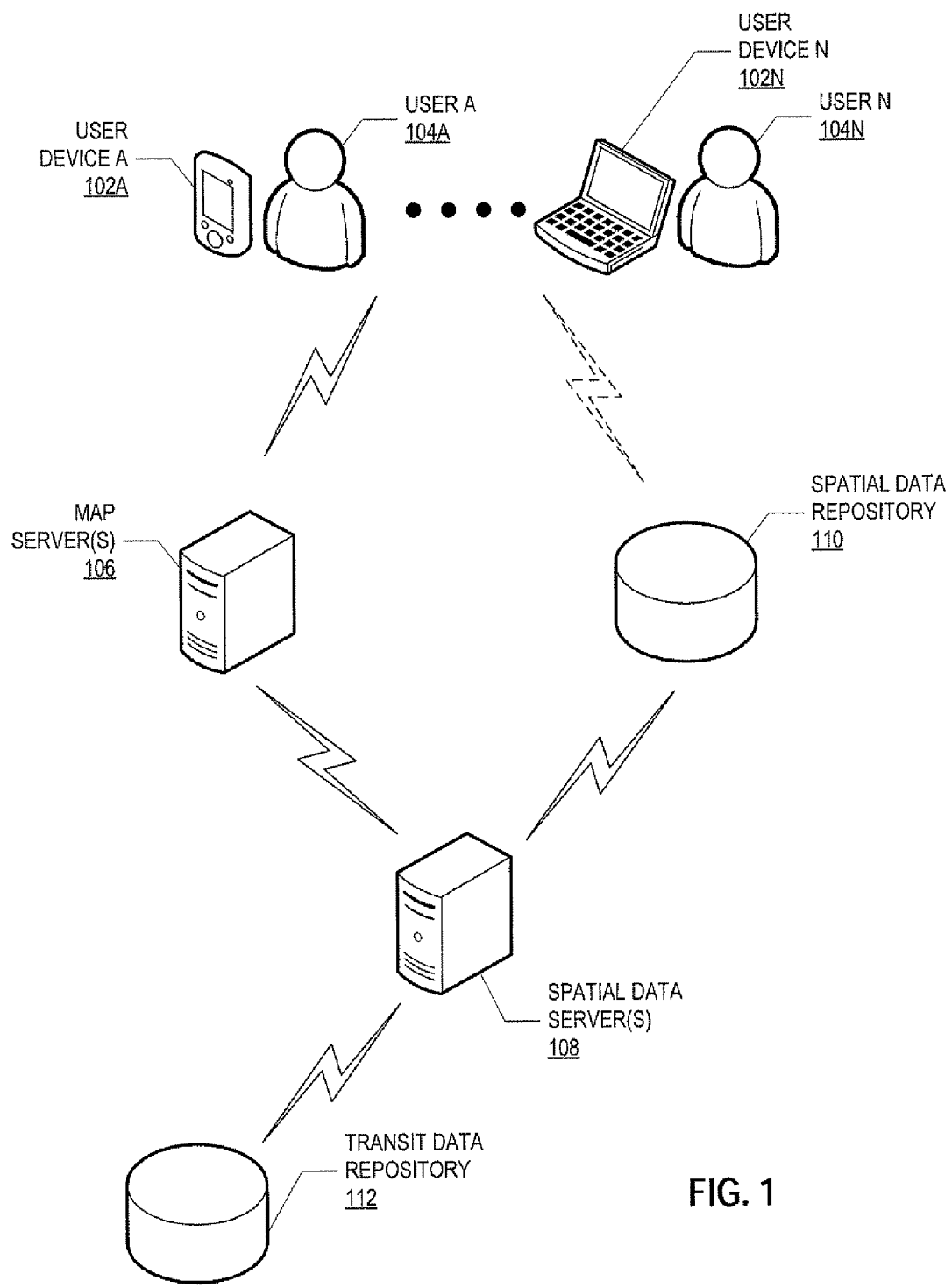
FIGS. 1 and 2A-2D show diagrams of systems in accordance with one or more embodiments.

While dynamically rendering transit maps is susceptible to various modifications and alternative forms, specific embodiments thereof are shown by way of example in the drawings and will herein be described in detail. The drawings may not be to scale. It should be understood, however, that the drawings and detailed description thereto are not intended to limit dynamically rendering transit maps to the particular form disclosed, but to the contrary, the intention is to cover all modifications, equivalents, and alternatives falling within the spirit and scope of the present disclosure as defined by the appended claims.

DETAILED DESCRIPTION

As discussed in more detail below, provided in some embodiments are systems and methods for dynamically rendering transit maps, which may be useful for a map service, navigation service, or other applications in which transit data at geographic locations are presented or analyzed. In one embodiment, the process for generating transit maps includes the steps of obtaining transit route information, performing a spatial comparison of a transit location in the transit route information with a roads spatial data layer, and modifying the transit location to intersect a road feature in the road spatial data layer based on the spatial comparison. Further, in some embodiments, the transit data may then be used to generate a transit map based on a transit layer style.

Examples of transit locations are bus stops, subway stations, train stations, park and rides, etc. The transit locations occur along transit routes such as bus routes, subway lines, train lines, high occupancy vehicle lanes, etc. In some embodiments, transit maps may include the transit locations and transit routes (transit data) as well as other spatial data including roads, points of interest, parks, rivers, etc. The transit data may be modified to be consistent with the roads by performing spatial comparisons and operations. For example, a transit location may be spatially compared to a road to determine whether the transit location intersects, is contained by, is equal to, is disjoint from, or contains the road. In this example, if the transit location does not intersect the road, a spatial operation may be performed to modify the transit location to intersect the road (i.e., the transit location may be snapped to the road).

FIG. 1 shows a diagram of a system in accordance with one embodiment. The system of this embodiment includes user devices (e.g., user device A 102A and user device N 102N) interacting with map server(s) 106, which in turn interact with spatial data server(s) 108. The illustrated spatial data server 108 stores information in a spatial data repository 110. Further, a transit data repository 112 provides transit information to the spatial data server(s) 108. FIG. 2 describes further aspects of the aforementioned components of FIG. 1.

Examples of user devices (e.g., user device A 102A, user device N 102N) include smartphones, tablet computers, laptop computers, etc. Each of the user devices (e.g., user device A 102A, user device N 102N) may be equipped with a positioning device to determine a location of the user device. The user devices may then perform map and navigation services using the location obtained from the positioning device. As shown in FIG. 1, the user devices (e.g., user device A 102A, user device N 102N) in this example are operated by users (e.g., user A 104A, user N 104N).

Each of the map server(s) 106 may be implemented on multiple computing devices (i.e., servers), where a load balancing scheme distributes requests across the multiple computing devices. The map server 106 is configured to provide maps, geographic coordinates, directions, etc. to the user devices (e.g., user device A 102A, user device N 102N). For example, the map server 106 may provide a transit map displayed on user device A 102A, where user A 104A uses the transit map to locate a nearby transit location. Alternatively or additionally, the map server 106 may, in some embodiments, also provide turn-by-turn directions associated with transit routes, which are viewed by the user A 104A on the user device A 102A. The map server 106 may be configured to obtain spatial data for maps from the spatial data server(s) 108.

In some embodiments, additional repositories (e.g., transit data repository 112) at the same or different location as the spatial repository 110 may also be queried by the map service server 108 to generate transit maps for the user devices (e.g., user device A 102A, user device N 102N). For example, the transit data repository 112 may provide transit data (e.g., transit locations, transit routes) that is maintained by a transit authority.

In some embodiments, the spatial data server 108 is configured to obtain and store spatial data in the spatial data repository 110. The stored spatial data may be later transmitted by the spatial data server 108 in response to requests from map server 106 for spatial data to be used in transit maps, or the stored spatial data may be analyzed by a spatial data analysis module to generate data based on the spatial data, e.g., to generate turn-by-turn directions along transit routes, to perform spatial comparisons of transit data and road data. Specifically, in this embodiment, the spatial data server 108 is configured to perform spatial queries for spatial data on the spatial data repository 110 and to send the spatial data to the map server 106. The spatial data is used by the map server 106 to generate transit maps to be displayed on the user devices (e.g., user device A 102A, user device N 102N) for the users (e.g., user A 104A, user N 104N).

For example, if user A 104A is traveling in Houston, Tex., the map server 106 may receive a request for a transit map from user device A 102A including the current geographic location of user A 104A. The map server 106 may then request spatial data (e.g., transit locations, transit routes, roads) located near the current location of the user A 104A from the spatial data server 108. In this case, the spatial data server 108 may obtain the spatial data by performing a spatial query on the spatial data repository 110 for spatial data within a threshold distance of the current location of user A 104A.

In response to receiving the spatial data from the spatial data server 108, the map server 106 may generate a transit map for the current location of the user A 104A. For example, the map server 106 may generate the transit map as a map image based on the spatial data and a transit layer style and then send the map image to the user device A 102A (i.e., server-side map image). In another example, the map server 106 may provide the spatial data and the transit layer style to the user device A 102A, which dynamically generates a transit map based on the spatial data and the transit layer style (i.e., client side dynamic map). The transit map may then be used to provide general transit information (e.g., transit time schedules, transit vehicles that stop at particular transit locations, visual transit routes, etc.) to the user A 104A of the user device A 102A. Alternatively or additionally, the user device A 102A may use the transit map to provide turn-by-turn directions to the user A 104A, where the current location of the user A 104A is tracked in real-time by a navigation service.

Figure 2A:
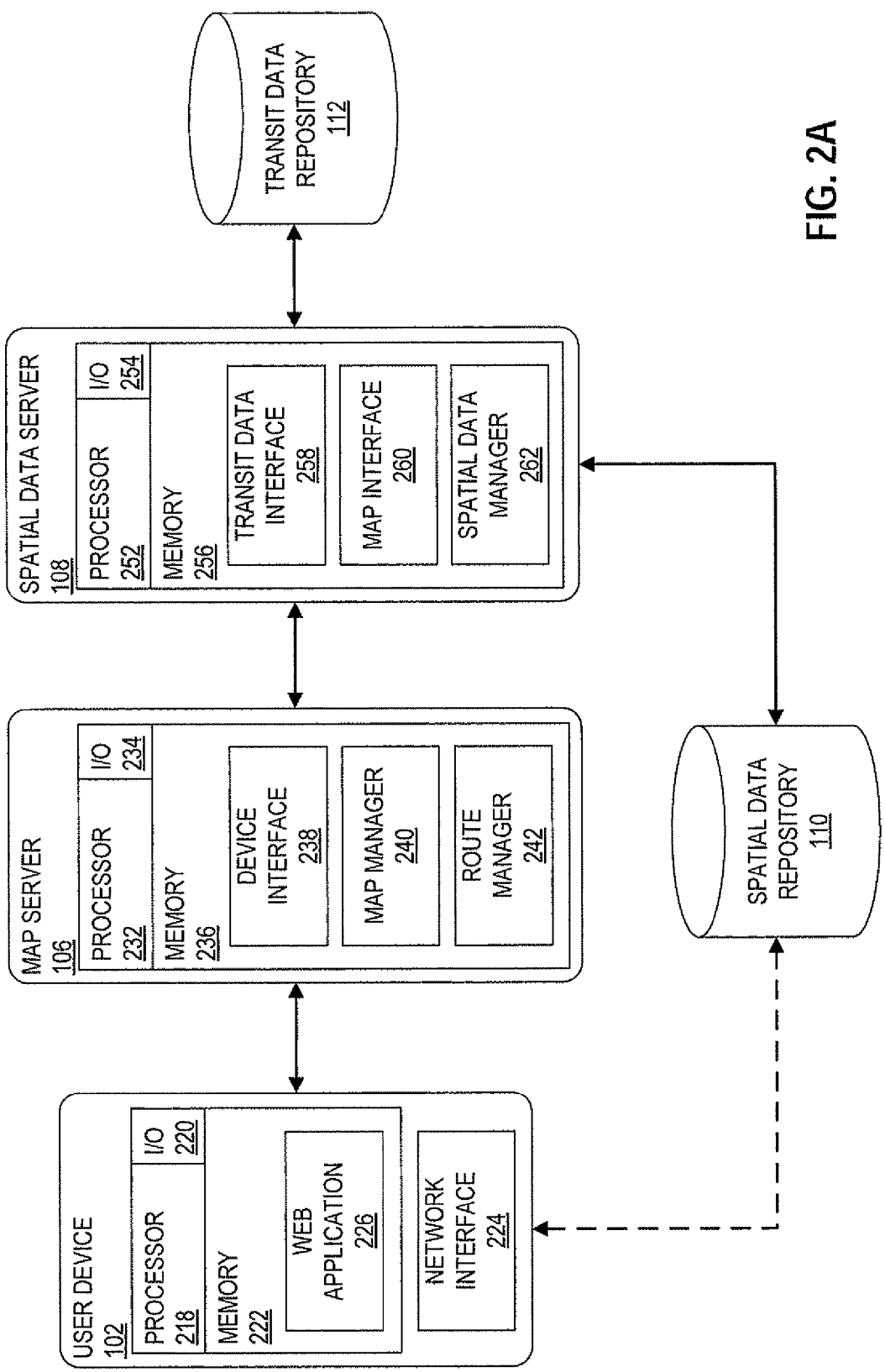

FIG. 2A shows a diagram of a system in accordance with some embodiments of dynamically rendering transit maps. The example system includes a user device 102 communicating with (e.g., interacting, receiving broadcasts from, or transmitting broadcasts to) a map server 106, which in turn interacts with a spatial data server 108. Further, the spatial data server 108 of this embodiment stores information in a spatial data repository 110 and interacts with a transit data repository 112.

In some embodiments, the user device 102 is a personal computer. For example, the user device 102 may be a desktop computer, a laptop computer, a smartphone, a tablet computer, a navigation device, a wirelessly-networked imaging device, a wirelessly-networked e-reader, an on-board computer of a vehicle, or other device with a connection to a network. In some embodiments, the user device 102 includes a network interface 224 configured to send data to and receive data from the map server 106. For instance, the network interface 224 may send map requests to and receive maps from the map server 106.

In some embodiments, the user device 102 includes a processor 218, an input/output module 220, and a memory 222. The user device 102 may be implemented as a computing device with an operating system, stored in the memory 222, for interacting with a user. For example, the operating system may be configured to provide applications (e.g., a map application, a social networking application, etc.) to the user. In some embodiments, the memory 222 includes a web application 226.

In some embodiments, the web application 226 of the user device 102 is configured to provide map services to a user. For example, the web application 226 may be configured to (1) generate transit maps; (2) display turn-by-turn directions involving public transit; and/or (3) transmit map requests to the map server 106. The web application 226 may include location information 266 of FIG. 2B describing the location (e.g., longitude and latitude) of the user device 102. The location information 266 of FIG. 2B may be obtained for the user device 102 from a location device (not shown). For example, the absolute location of the user device 102 may be determined based on GPS signals received from GPS satellites. In this example, the absolute location may be geographic coordinates identifying the location of the user device 102 in a geographic coordinate system. In another example, the relative location of the user device 102 may be determined based on mobile phone signals received from one or more mobile network towers. In this example, the relative location may specify the location of the user device 102 with reference to the mobile network towers.

Figure 2C:
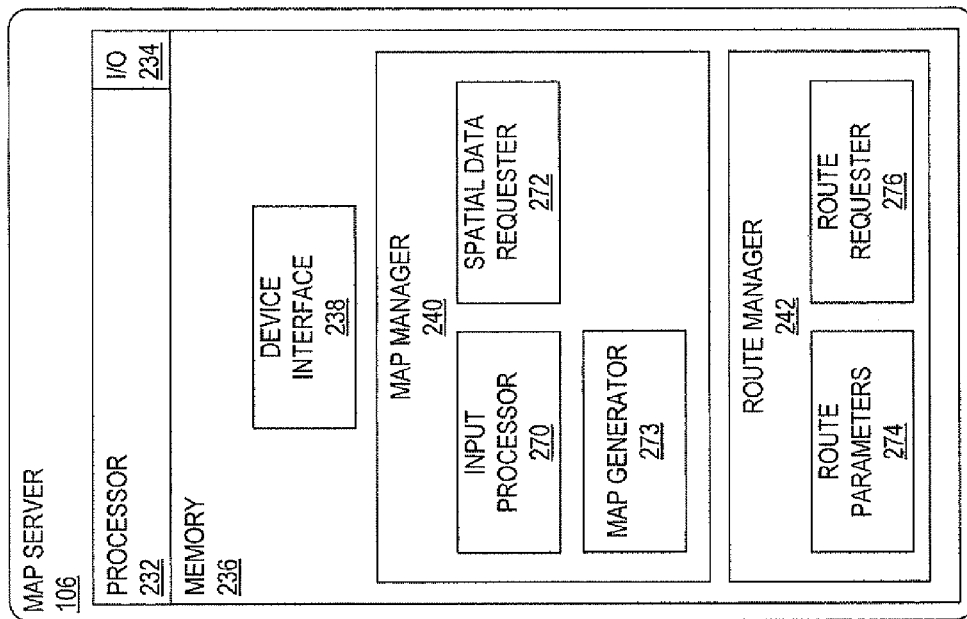
Figure 2B:
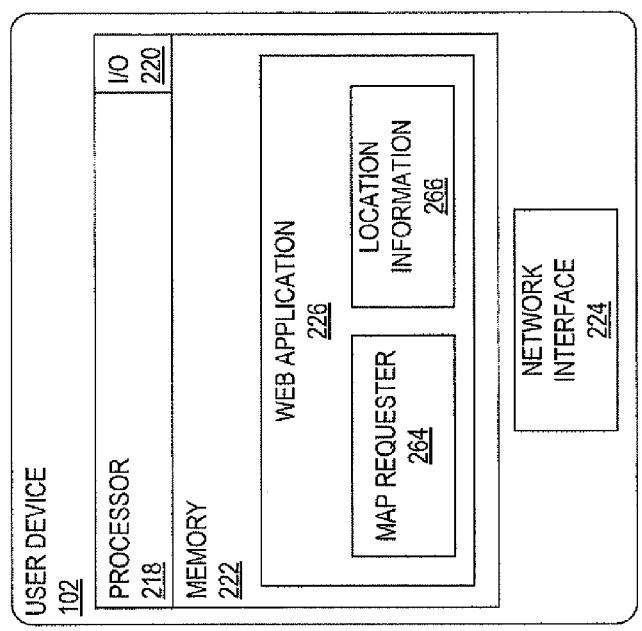

In some embodiments, the web application 226 further includes a reap requester 264 of FIG. 2B configured to obtain maps from the map server 106. For example, the map requester 264 of FIG. 2B may send a map request requesting a transit map for a location specified by the user. In this example, the map request may include user parameters such as transit data filters, a current location, a start location, a destination location, etc. The map requester 264 of FIG. 2B may be configured to receive the requested maps from the map server 106 and to display the maps for the user.

In some embodiments, the map server 106 includes a processor 232, an input/output module 234, and memory 236. The map server 106 may include various types of computing devices that execute an operating system. The processor 232 may execute instructions, including instructions stored in the memory 236. The instructions, like the other instructions executed by computing devices herein, may be stored on a non-transitory computer readable medium such as an optical disk (e.g., compact disc, digital versatile disk, etc.), a flash drive, a hard drive, or any other computer readable storage device. The input/output module 234 of the map server 106 may include an input module, such as a radio frequency sensor, a keyboard, and/or a mouse, and an output module, such as a radio frequency transmitter, a printer, and/or a monitor. The map server 106 may be connected to a local area network (LAN) or a wide area network (e.g., the Internet) via a network interface connection. In some embodiments, the input/output module 234 may take other forms.

Further, the map server 106 may be implemented as a node of a distributed system, where the other portions of the distributed system are located on different nodes. The nodes of the distributed system may correspond to computing devices as discussed above. Alternatively, the nodes of the distributed system may correspond to multiple processors/cores with shared memory in a single computing device. In some embodiments, the memory 236 includes a device interface 238, a map manager 240, and a route manager 242. The aforementioned components of the map server 106 may be implemented on multiple computing devices (i.e., servers), where a load balancing scheme distributes requests across the multiple computing devices.

In some embodiments, the device interface 238 of the map server 106 is configured to process maps requests from the user device 102. The device interface 238 may be configured to extract user parameters from the map requests and to forward the extracted user parameters to the map manager 240. For example, the user parameters may include a transit data filter for limiting the transit routes displayed in the transit map. In this example, transit data filters may filter the transit data to only include transit routes that are in service with a selected time period, to only include a selected transit route, etc. In another example, the user parameters may include a current location of the user device 102. The device interface 238 may be configured to obtain requested maps from the map manager 240 for providing to the user device 102.

In some embodiments, the map manager 240 includes an input processor 270 of FIG. 2C configured to process user parameters received from the device interface 238. The input processor 270 of FIG. 2C may be configured to process the user parameters to identify spatial data (e.g., transit location points, transit route polylines, road polylines, etc.) for generating the requested maps. For example, the input processor 270 of FIG. 2C may identify a transit route layer having spatial data for building a transit map based on a user parameter requesting transit routes near a location. In some embodiments, the map manager 240 includes a spatial data requester 272 of FIG. 2C configured to obtain the spatial data identified by the input processor 270 of FIG. 2C from the spatial data server 108. In another example, the input processor 270 of FIG. 2C may determine that turn-by-turn directions are requested based on the user parameters. In this example, the input processor 270 of FIG. 2C may determine route parameters (e.g., start location, end location, traveling preferences, etc.) based on the user parameters, where the route parameters 274 of FIG. 2C are provided to the route manager 242.

In some embodiments, a map layer includes spatial features (e.g., points, polylines, polygons, vectors, etc.) of a data type (e.g., transit locations, transit routes, roads, cities, rivers, state boundaries, etc.) for presenting in a map. For example, a transit location map layer may include points for transit locations in a geographic area. In another example, a transit route map layer may include polylines for transit routes in a geographic area.

In some embodiments, spatial data describes the geographic location of features (e.g., points of interest, cities, geo-located images, etc.) and boundaries (e.g., rivers, county boundaries, state boundaries, country boundaries, etc.). Typically, spatial data is stored in the form of points, polylines, polygons, vectors, imagery, or some other shape. For example, geographic coordinates and associated metadata for points of interest may be stored in a point map layer. In another example, boundaries and associated metadata for geographic areas may be stored in a polygon map layer. Spatial queries may be performed between mapping layers by performing spatial comparisons (e.g., comparisons for intersections, comparisons for disjointedness, etc.) of the shapes in each of the mapping layers.

In some embodiments, the map manager 240 includes a spatial data requester 272 of FIG. 2C configured to obtain spatial data (e.g., transit locations, transit routes, roads, etc.) from the spatial data server 210 based on the user parameters. For example, the spatial data requester 272 of FIG. 2C may send a spatial data request to the spatial data server 108 requesting transit data for a geographic area. In this example, the spatial data request may specify a map scale (i.e., a ratio of map distance to corresponding actual distance on the ground) and a map extent (i.e., the outer bounds of the geographic area shown in a map) for the transit data. For instance, if the user parameters are for a detailed map of nearby transit locations, the spatial data request may specify a larger scale (e.g., one centimeter to 100 meters) and a map extent of a few square kilometers.

In some embodiments, the spatial data requester 272 of FIG. 2C is configured to also obtain map styles from the spatial data server 210 for rendering the spatial data. A map style may specify various rules for rendering spatial data such as label font color, label font size, label position, polyline thickness, color of spatial features, etc. Map styles may be defined for map layers, labels, symbols, or other map features. For instance, a transit route layer style may specify that transit route labels showing transit route numbers should be rendered on roads. In this case, the transit route layer style may also specify that the transit route labels should not intersect road labels showing road names. In another example, a transit location layer style may specify that transit locations should be rendered as transit symbols with mouse-over callouts describing the transit locations.

In some embodiments, the map manager 240 includes a map generator 273 of FIG. 2C configured to generate maps using the spatial data obtain by the spatial data requester 272 of FIG. 2C. The map generator 273 of FIG. 2C may generate transit maps for the device interface 238 to provide to the user device 102 in response to map requests. For example, the map generator 273 of FIG. 2C may consolidate the spatial data and corresponding map styles for a transit map, which is transmitted by the device interface 238 to the user device (102). In this example, the transit map may be dynamically rendered by the web application 226 of the user device 102 (i.e., client side dynamic map). In another example, the map generator 273 of FIG. 2C may generate a map image based on the spatial data and corresponding map styles for a transit map, where the map image is transmitted by the device interface 238 to the user device 102 (i.e., server side map image). In some embodiments, when requested by the user parameters, the map generator 273 of FIG. 2C is configured to obtain turn-by-turn directions from the route manager 242.

In some embodiments, the route manager 242 of the map server 106 is configured to obtain routes for map requests of user devices (e.g., user device 102). Specifically, the route manager 242 may include: (1) route parameters 274 of FIG. 2C received from the input processor 270 of FIG. 2C; and (2) a route requester 276 of FIG. 2C configured to obtain turn-by-turn directions based on the route parameters 274 of FIG. 2C from the spatial data server 108.

In some embodiments, the spatial data server 108 is a computing device configured to provide spatial data to map servers (e.g., map server 106) and user devices (e.g., user device 102). In some embodiments, the spatial data server 108 includes a processor 252, an input/output module 254, and a memory 256. The spatial data server 108 may be implemented as a computing device with similar characteristics as discussed above with respect to the map server 106. In some embodiments, the memory 256 includes a transit data interface 258, a map interface 260, and a spatial data manager 262. The aforementioned components of the spatial data server 108 may be implemented on multiple computing devices (i.e., servers), where a load balancing scheme distributes requests across the multiple computing devices.

In some embodiments, the transit data interface 258 of the spatial data server 108 is configured to obtain transit data from the transit data repository 112. Transit data may include transit routes, transit locations, and related metadata. For example, the transit data may be obtained from the transit data repository 112 in the form of spatial data (e.g., polylines for transit routes, points for transit locations). In another example, the transit data may be obtained from the transit data repository 112 in the form of data: records (e.g., geographic coordinates in a data table). Transit locations may correspond to bus stops, subway stations, train stations, park and rides, etc. For transit locations, examples of related metadata may include transit routes that stop at each transit location, stop times for routes at each transit location, and the intersection of each transit location. Transit routes may correspond to bus routes, subway lines, train lines, high occupancy vehicle lanes, etc. For transit routes, examples of related metadata may include transit stops for each transit route, transit route identifiers (e.g., bus route numbers, subway line numbers, etc.), service times for each transit route, and fares for each transit route.

In some embodiments, the map interface 260 of the spatial data server 108 is configured to process spatial data requests from the map server 106. Specifically, the map interface 260 may include a map server interface 284 of FIG. 2D configured to (1) receive spatial data requests from the map server 106 and (2) send requested spatial data to the map server 106. The map server interface 284 of FIG. 2D may forward spatial data requests received from the map server 106 to the spatial data manager 262 for processing. In some embodiments, the map interface 260 includes a map style provider 286 of FIG. 4D configured to obtain map styles for the map server 106. For example, the map style provider 286 of FIG. 4D may be configured to obtain map styles related to requested spatial data (e.g., map layers, routes, etc.) from the spatial data repository 110. In this example, the map styles related to the requested spatial data may also be sent to the map server 106 by the map server interface 284 of FIG. 4D.

In some embodiments, the spatial data manager 260 of the spatial data server 108 is configured to manage spatial data stored in the spatial data repository 110. The spatial data manager 262 may include a spatial data interface 288 of FIG. 2D configured to access and modify data in the spatial data repository 110. For example, the spatial data interface 288 of FIG. 2D may be configured to execute database commands to retrieve or modify database records in the spatial data repository 110. In an exemplary embodiment, the spatial data interface 288 of FIG. 2D may be used by the other modules (e.g., spatial operator 290, spatial comparer 292, spatial query builder 294, spatial routing engine 296) of the spatial data manager 262 to perform spatial or data operations.

Figure 2D:
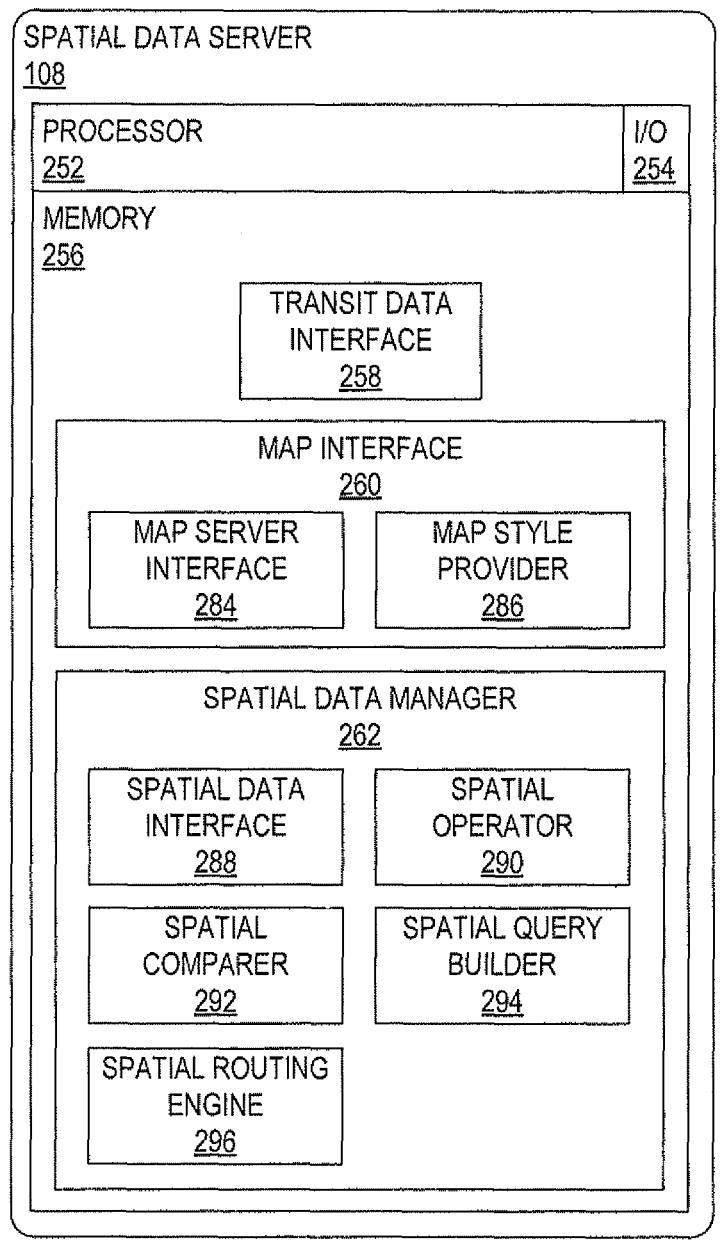

In some embodiments, the spatial data manager 262 may include a spatial operator 290 of FIG. 2D configured to perform spatial operations on spatial data. Examples of spatial operations may include intersecting spatial features, snapping one spatial feature to another, unioning spatial features, buffering a spatial feature, and differencing spatial features. The spatial operator 290 of FIG. 2D may perform the spatial operations on spatial data retrieved from the spatial data repository 110 by the spatial data interface 288 of FIG. 2D. For example, the spatial operator 290 of FIG. 2D may snap a transit route feature to a road feature. In this example, the transit route feature is a polyline having a transit vertex that is disjoint from the road feature, and the transit route feature is snapped to the road feature by moving the disjoint transit vertex to the nearest road vertex of the road feature. In this case, the results of the spatial operation may be stored in the spatial repository 110 by the spatial data interface 288 of FIG. 2D.

In some embodiments, the spatial data manager 262 may include a spatial comparer 292 of FIG. 2D configured to perform spatial comparisons of spatial data. Examples of spatial comparisons may include determining whether spatial features intersect, determining whether a spatial feature is contained by another spatial feature, determining whether a spatial feature contains another spatial feature, determining whether spatial features are disjoint, determining whether a spatial feature is equal to another spatial feature, and determining whether a spatial feature touches another spatial feature. For example, the spatial comparer 292 of FIG. 2D may determine whether a transit location feature intersects a road feature. The spatial comparer 292 of FIG. 2D may perform the spatial operations on spatial data retrieved from the spatial data repository 110 by the spatial data interface 288 of FIG. 2D.

In some embodiments, the spatial data manager 262 may include a spatial query builder 294 of FIG. 2D configured to generate database commands for retrieving or modifying spatial data in the spatial data repository 110. For example, the spatial query builder 294 of FIG. 2D may build structured query language (SQL) statements for retrieving or modifying spatial data. In this example, the spatial data interface 288 of FIG. 2D may be configured to execute the SQL statements to retrieve or modify spatial data in the spatial data repository 110.

In some embodiments, the spatial data manager 262 may include a spatial routing engine 296 of FIG. 2D configured to determine routes based on route parameters. For instance, the spatial routing engine 296 of FIG. 2D may be configured to determine a transit route between a start location and an end location. In this example, the transit route may be determined using a routing algorithm having various configurations (e.g., shortest route, fastest route, avoiding highways, avoiding tollways, use public transportation) that are specified in the routing parameters. In an exemplary embodiment, the spatial routing engine 296 of FIG. 2D may determine a route represented by a polyline and associated route information (e.g., distance, travel time, turn-by-turn directions, etc.) based on spatial data from a transit route layer or a road layer that is stored in the spatial data repository 110. The route polyline may have a number of route segments, where the route information is also determined per segment (e.g., segment distance, segment travel time, etc.).

In some embodiments, the spatial data repository 110 is configured to store spatial data and map styles for use by a map service. The stored spatial data may include spatial features (e.g., geographic coordinates, lines, polylines, polygons, etc.) and associated metadata (e.g., transit stop times, transit route lines, road names, county names, etc.). The spatial data repository 110 may correspond to a server, a database, files, a memory cache, etc. that is stored locally (e.g., located on the spatial data server) or shared on a network (e.g., a database server). The user device 102 may interact directly with the spatial data repository 110 to obtain spatial data to, for example, obtain real-time updates for a client side dynamic map. In some embodiments, the metadata associated with the spatial features may be stored in a separate repository (not shown). For example, the spatial data repository 110 and the separate repository may be organized in a distributed relational database architecture.

In some embodiments, the spatial data repository 110, or a related repository, is configured to store information related to the spatial data. For example, the spatial data repository 110 may also store results of analysis (e.g., turn-by-turn directions, etc.) performed on the spatial data.

In some embodiments, the transit data repository 112 is configured to store transit data. The stored transit data may include transit locations, transit routes, and associated metadata (e.g., transit stop times, transit route lines, road names, county names, etc.). The transit data repository 112 may correspond to a server, a database, files, a memory cache, etc. that is stored locally (e.g., located on the spatial data server) or shared on a network (e.g., a database server).

Figure 3:
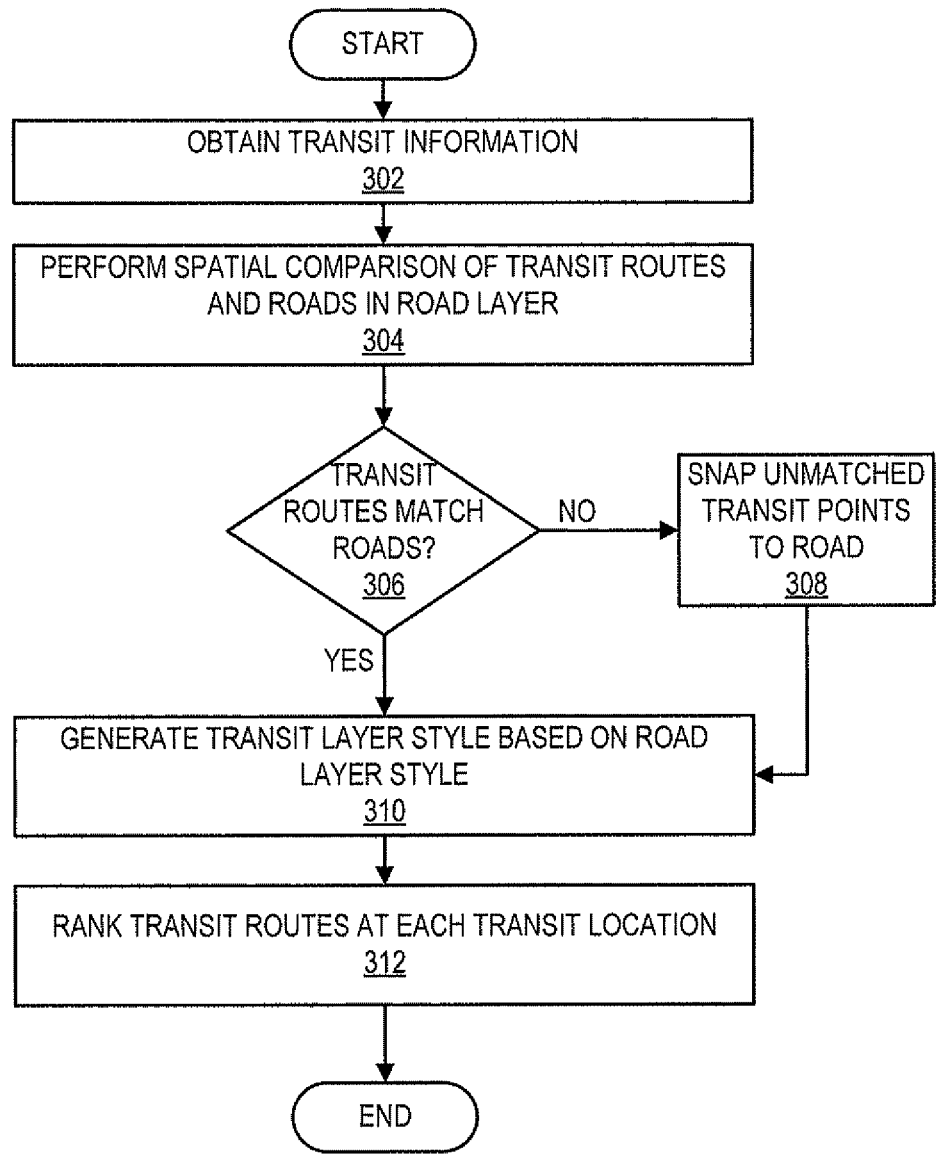
FIG. 3 shows a flow chart in accordance with one or more embodiments.

FIG. 3 shows a flow chart in accordance with certain embodiments. More specifically, FIG. 3 is a flow chart of a method performed by a spatial data server for obtaining transit data. The transit data may be obtained for a map service or for other purposes. As is the case with the other processes described herein, various embodiments may not include all of the steps described below, may include additional steps, and may sequence the steps differently. Accordingly, the specific arrangement of steps shown in FIG. 3 should not be construed as limiting the scope of dynamically rendering transit maps.

In step 302 of this embodiment, transit information is obtained from a transit data repository. For example, the transit information may be maintained in a transit data repository by a transit authority. In this example, the transit authority may collect the transit information using global positioning systems (GPS) installed on transit vehicles. The transit information may include transit locations and transit routes. The transit location and transit routes may be obtained as spatial data such as geographic points and polylines respectively. In this case, the transit spatial data may not be consistent with other spatial data used by a map service.

In step 304 of the present embodiment, the transit routes obtained in step 302 are spatially compared to roads in a road layer. Specifically, each of the transit routes may be compared to the roads in the road layer to determine whether the transit route intersects or is equivalent to a road (i.e., to determine whether the transit route overlaps a road). In step 306, it is determined whether the transit routes match the roads in the road layer. If the transit routes do not match (i.e., intersect or are equivalent to) the roads, the unmatched transit vertices in the transit routes are snapped to the roads in step 308. The transit vertices refer to vertices of polylines representing the transit routes. Bus transit routes typically occur on roads; thus, the transit routes should mirror roads in the road layer. However, inconsistencies may inconsistencies occur in the transit routes for a variety of reasons including different levels of precision, different origins of data, different geographic coordinate systems, etc. For example, if the transit routes and roads are stored with different levels of precision, transit routes having a lower level precision may be inconsistent with roads having a higher level of precision because the missing decimals in the geographic coordinates of the transit routes are rounded to zero. In another example, transit routes collected by GPS may be inconsistent with roads obtained from historical maps. By snapping the inconsistent transit vertices to a nearest vertex on a road, the inconsistencies in the transit routes are resolved, and the flow chart proceeds to step 310.

If the transit routes do match (i.e., intersect or are equivalent to) the roads in the road layer, a transit layer style is generated based on the road layer style in step 310. The road layer style may be obtained from the spatial data repository storing the road layer. The road layer style describes how the roads from the road layer should be rendered in a map. For example, the road layer style may specify that roads should be rendered as white polylines with a specified thickness. In this example, the road layer style may further specify that representations of the roads (e.g., road names) should be rendered as road labels along the interior of the road polylines. Based on the road layer style, the transit layer style may be generated to specify that (1) roads with transit routes should be rendered with a different color (e.g., light blue) and (2) representations of transit routes (e.g., transit route numbers) should be rendered as transit labels following the road labels along the interior of the road polylines. In an exemplary embodiment, roads that overlap transit routes are rendered with the transit layer style, and roads that do not overlap transit routes are rendered with the road layer style.

In some embodiments, steps 304 to 310 may also be performed to also modify transit locations obtained in step 302 to be consistent with the roads in the road layer. Specifically, the transit locations may be compared to the roads to identify inconsistent transit locations, which are then snapped to the roads in the road layer.

In step 312, transit routes are ranked by importance at each of the transit locations. For example, transit routes may be ranked at a transit location based on the number of stops each transit route makes at the transit location (i.e., transit routes that stop at the transit location more often are ranked higher). In another example, transit routes may be ranked at a transit location based on the chronological order of their stops beginning at a selected time. In yet another example, the transit routes may be ranked based on multiple factors including the number of stops, the chronological order of stops, etc. In some embodiments, the transit layer style may render transit labels based on the rank of the transit routes. Specifically, the order of transit route numbers displayed in the transit label may correspond to the rank of the transit routes. In this case, if a transit label has limited space on the map, a limited number of the highest ranked transit route numbers are rendered in the transit label.

Figure 4A:
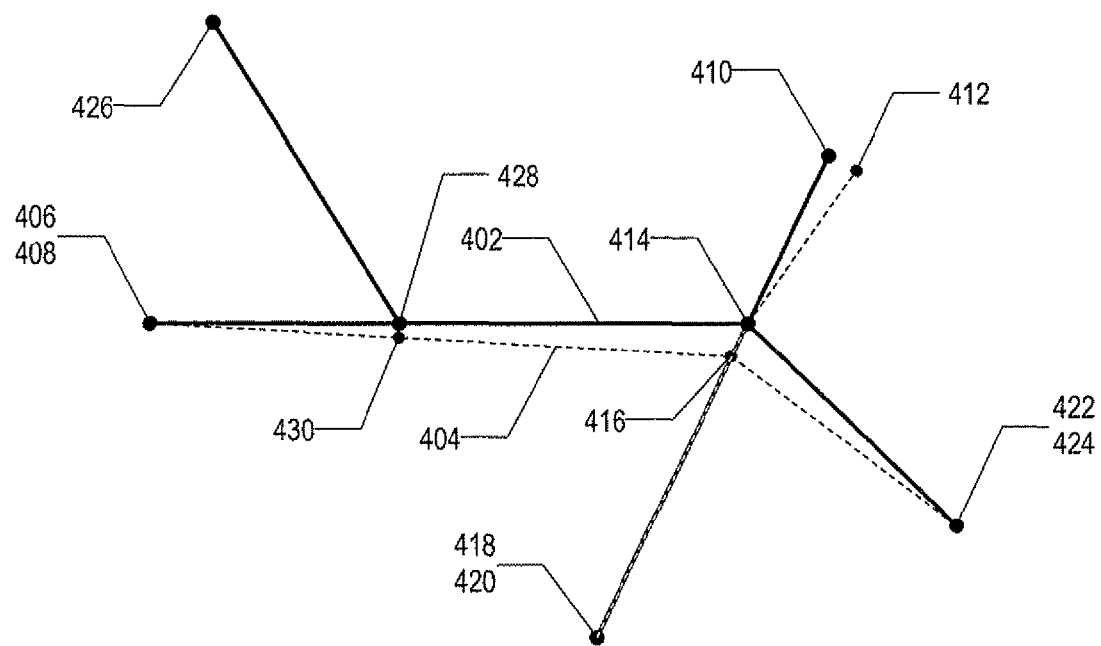
FIGS. 4A-4B shows example transit data in accordance with one or more embodiments.
Figure 4B:
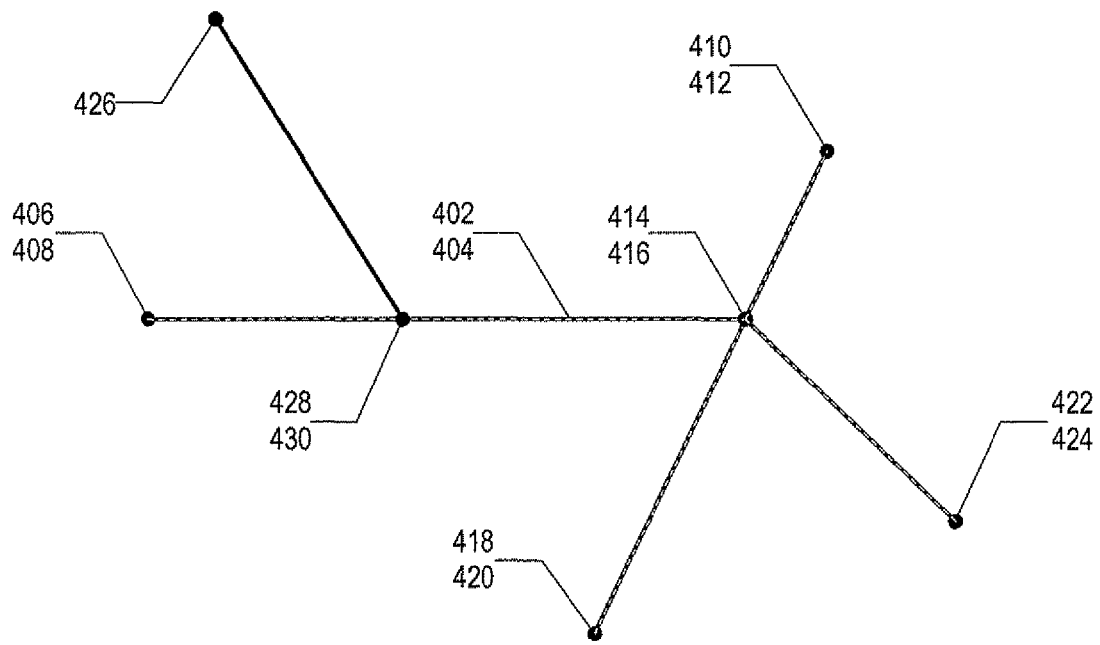

FIGS. 4A and 4B show exemplary transit data in accordance with certain embodiments of dynamically rendering transit maps. More specifically, FIGS. 4A and 4B show example maps with roads 402 and transit routes 404. The roads 402 include road intersections 406, 410, 414, 418, 422, 426, and 428. The transit routes 404 include transit locations 408, 412, 416, 420, 424, and 430.

As shown in FIG. 4A, the transit routes 404 are inconsistent with the roads 402. Specifically, in FIG. 4A, a spatial comparison of the transit routes 404 and the roads 402 shows that transit locations 412, 416, and 430 do not intersect corresponding road intersections 410, 414, and 428. As discussed above, the transit routes 404 may be inconsistent with the roads 402 for a variety of reasons including different levels of precision, different origins of data, different geographic coordinate systems, etc.

Referring now to FIG. 4B, a spatial operation is performed to snap the transit routes 404 to the roads 402. Specifically, in FIG. 4B, the transit locations 412, 416, and 430 are snapped to corresponding road intersections 410, 414, and 428. When the transit routes 404 are consistent with the roads 402 as shown in FIG. 4B, labels including both road names and transit route numbers may be simultaneously rendered for the overlapping transit routes 404 and roads 402. For example, the roads 402 may be rendered with labels including both road names and transit route numbers as discussed below with respect to FIG. 6.

Figure 5:
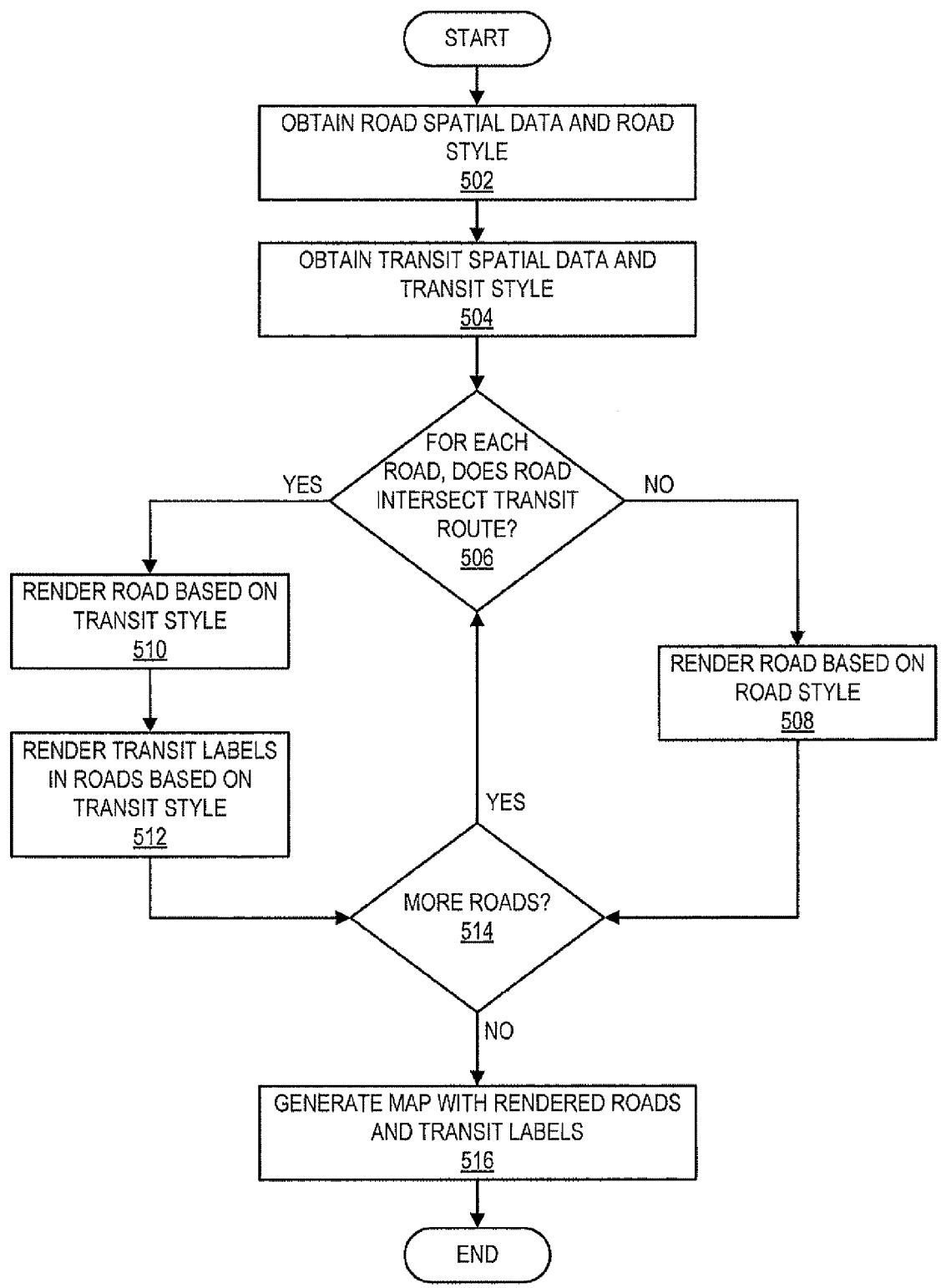
FIG. 5 shows a flow chart in accordance with one or more embodiments.

FIG. 5 shows a flow chart in accordance with certain embodiments. More specifically, FIG. 5 is a flow chart of a method performed by a map server to generate transit maps. As is the case with the other processes described herein, various embodiments may not include all of the steps described below, may include additional steps, and may sequence the steps differently. Accordingly, the specific arrangement of steps shown in FIG. 5 should not be construed as limiting the scope of dynamically rendering transit maps.

In step 502 of this embodiment, road spatial data and a road style are obtained. For example, road polylines and a road style for rendering the road polylines may be obtained from a spatial data server. In step 504 of this embodiment, transit spatial data and a transit style are obtained. For example, transit route polylines and a transit style for rendering the transit route polylines may be obtained from the spatial data server.

In step 506 of this embodiment, each road polyline is processed to determine whether the road polyline intersects a transit route polyline. The road polyline may be spatially compared to the transit route polylines to determine if the road polyline is consistent with a transit route polyline. If the road polyline does not intersect a transit route polyline, the road polyline is rendered based on the road style in step 508. The road style may specify that the road polyline should be rendered in white with road name labels along the interior of the road polyline. After the road polyline is rendered, the flow chart proceeds to step 514.

If the road polyline does intersect the transit route polyline, the road polyline is rendered based on the transit style in step 510. The transit style may specify that the road polyline should be rendered in blue with road name labels along the interior of the road polyline. In this case, the transit style may further specify that the road name labels should be rendered at greater distance intervals along the road polyline than specified in the road style. In step 512 of this embodiment, transit route labels are rendered based on the transit style. The transit route labels may be rendered as transit route numbers along the interior of the road polyline. In some embodiments, the transit route labels occur after the road name labels along the interior of the road polyline.

In other embodiments, the road name labels and transit route labels may be rendered in different positions with respect to the road polylines. For example, one or both sets of labels may be rendered adjacent to and following the road polylines. In another example, one or both sets of labels may be rendered in call-out boxes linked to the road polylines.

In step 514 of this embodiment, a determination is made as to whether there are more roads to process. If there are more roads to process, the flow chart returns to step 506. If there are no more roads to process, a map is generated with the rendered road polylines and transit labels in step 516. The map may then be provided to a user device in response to a map request.

Figure 6:
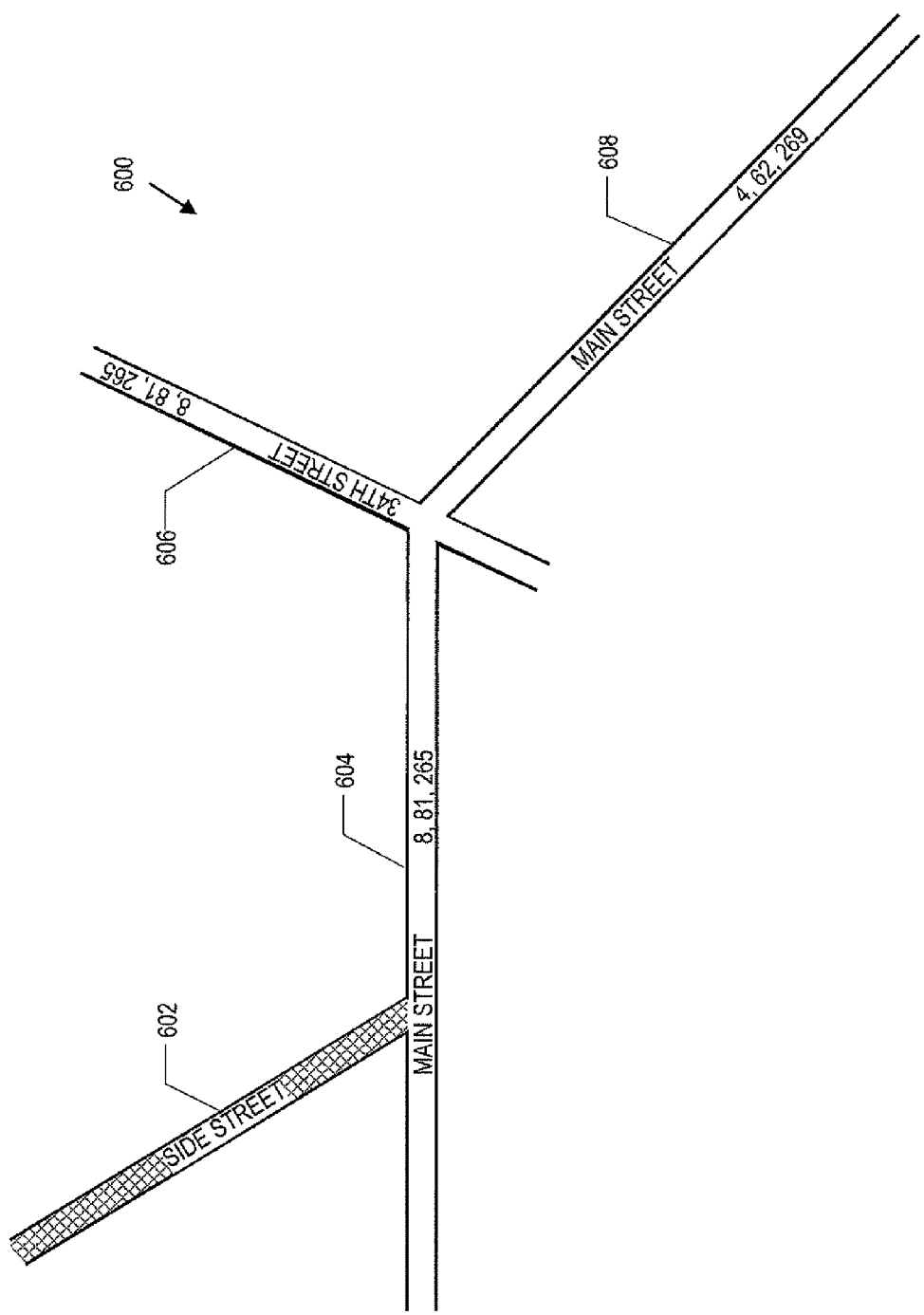
FIG. 6 shows an example transit map in accordance with one or more embodiments.

FIG. 6 shows an exemplary transit map 600 in accordance with certain embodiments of dynamically rendering transit maps. More specifically, FIG. 6 shows an example map 600 including roads 602, 604, 606, and 608. In this example, side street 602 is rendered based on a road style. The road style specifies that side street 602 should be rendered in a cross hatch pattern and a road name label.

As shown in FIG. 6, main street west 604, $34^{th}$ street 606, and main street east 608 are rendered based on a transit style. The transit style specifies that main street west 604 should be rendered in white with a road name label and a transit route label. The transit route label of main street west 604 identifies the three transit routes ("8, 81, 265") that travel along main street west 604. The transit route label of $34^{th}$ street 606 identifies the three transit routes ("8, 81, 265") that travel along $34^{th}$ street 606. The transit route label of main street east 608 identifies the three transit routes ("4, 62, 269") that travel along main street east 608. In this example, only the three highest ranking routes are included in each of the transit route labels.

The example transit map 600 simultaneously renders road name labels and transit route labels on roads that intersect transit routes. As shown in FIG. 6, the transit routes ("8, 81, 265") on main street west 604 do not continue onto main street east 608. Instead, the transit routes ("8, 81, 265") continue on $34^{th}$ street 606.

In some embodiments, the transit routes include in the transit route labels shown in FIG. 6 may be filtered based on user selections. For example, a user may request a transit map showing only transit routes that are in service during a selected time period. In another example, a user may request a transit map that shows only a selected transit route. In yet another example, the transit routes shown in a transit map may be determined based on the scale of the map (i.e., the number of transit routes shown increases as the detail of the transit map increases). In this example, the transit route labels may be updated dynamically as the user modifies the zoom level of the transit map.

In some embodiments, the transit map may be dynamically updated based on a transit data filter (e.g., a selected time period, a selected transit route, etc.) specified by the user. In this case, the transit route labels in the transit map may be dynamically updated (1) to include transit routes satisfying the transit data filter and (2) to exclude transit routes failing to satisfy the transit data filter.

While dynamically rendering transit maps has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present embodiments may suitably comprise, consist or consist essentially of the elements disclosed and may be practiced in the absence of an element not disclosed.

As used throughout this application, the word "may" is used in a permissive sense (i.e., meaning having the potential to), rather than the mandatory sense (i.e., meaning must). The words "include", "including", and "includes" mean including, but not limited to. As used throughout this application, the singular forms "a", "an" and "the" include plural referents unless the content clearly indicates otherwise. Thus, for example, reference to "an element" includes two or more elements. Unless specifically stated otherwise, as apparent from the discussion, it is appreciated that throughout this specification discussions utilizing terms such as "processing", "computing", "calculating", "determining" or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical electronic or magnetic quantities within memories, registers, or other information storage devices, transmission devices, or display devices of the special purpose computer or similar special purpose electronic processing/computing device.

I claim:

1. A method for generating transit maps, the method comprising:
   obtaining a plurality of transit route features;
   performing by one or more processors a spatial comparison of a first transit route feature of the plurality of transit route features with a road spatial data layer;
   modifying by the one or more processors a transit location of the first transit route feature to intersect a road feature of the road spatial data layer based on the spatial comparison;
   obtaining a road layer style for the road spatial data layer;
   determining by the one or more processors a transit layer style for the first transit route feature based on the road layer style; and
   generating, based on the transit layer style, a transit map such that a transit label for the first transit route feature is contained by the road feature.

2. The method of claim 1, further comprising:
   determining a rank for each of the plurality of transit route features at the transit location based on a frequency of transit stops of each of the plurality of transit route features.

3. The method of claim 2, wherein the transit label comprises a representation of the first transit route feature, the first transit route feature having a greater frequency of transit stops than a second transit route feature of the plurality of transit route features, and wherein the transit label excludes the second transit route feature.

4. The method of claim 2, wherein the transit label comprises a first representation of the first transit route feature and a second representation of a second transit route feature of the plurality of transit route features, wherein the first representation is presented before the second representation in the transit label based on the first transit route feature having a greater frequency of transit stops than the second transit route feature.

5. The method of claim 1, further comprising:
   receiving a request to filter the transit map, the request to filter comprising a selected transit route feature of the plurality of transit route features; and
   updating the transit label to include a representation of the selected transit route feature and to exclude unselected transit route features of the plurality of transit route features.

6. The method of claim 1, further comprising:
   receiving a request to filter the transit map, the request to filter comprising a selected time period for the transit location; and
   updating the transit label:
      to include a representation of a second transit route feature of the plurality of transit route features, the second transit route feature having a transit stop at the transit location within the selected time period, and
      to exclude transit route features of the plurality of transit route features that do not have a transit stop at the transit location within the selected time period.

7. The method of claim 1, wherein the road feature is represented in the transit map based on the transit layer style, and wherein a second road feature that does not intersect the plurality of transit route features is represented in the transit map based on the road layer style.

8. A system, comprising:
   one or more memories;
   one or more processors, each operatively connected to at least one of the one or more memories;
   a spatial data manager module stored on the one or more memories, the spatial data manager module being executed by the one or more processors to:
      obtain a plurality of transit route features;
      perform a spatial comparison of a first transit route feature of the plurality of transit route features with a road spatial data layer;
      modify a transit location of the first transit route feature to intersect a road feature of the road spatial data layer based on the spatial comparison;
      obtain a road layer style for the road spatial data layer; and
      determine a transit layer style for the first transit route feature based on the road layer style; and
   a map manager module stored on the one or more memories, the map manager module being executed by the one or more processors to generate, based on the transit layer style, a transit map such that a transit label for the first transit route feature is contained by the road feature.

9. The system of claim 8, wherein the spatial data manager module is further executed by the one or more processors to:
   determine a rank for each of the plurality of transit route features at the transit location based on a frequency of transit stops of each of the plurality of transit route features.

10. The system of claim 9, wherein the transit label comprises a representation of the first transit route feature, the first transit route feature having a greater frequency of transit stops than a second transit route feature of the plurality of transit route features, and wherein the transit label excludes the second transit route feature.

11. The system of claim 9, wherein the transit label comprises a first representation of the first transit route feature and a second representation of a second transit route feature of the plurality of transit route features, wherein the first representation is presented before the second representation in the transit label based on the first transit route feature having a greater frequency of transit stops than the second transit route feature.

12. The system of claim 8, wherein the spatial data manager module is further executed by the one or more processors to receive a request to filter the transit map, the request to filter comprising a selected transit route feature of the plurality of transit route features; and wherein the map manager module is further executed by the one or more processors to update the transit label to include a representation of the selected transit route feature and to exclude unselected transit route features of the plurality of transit route features.

13. The system of claim 8, wherein the spatial data manager module is further executed by the one or more processors to receive a request to filter the transit map, the request to filter comprising a selected time period for the transit location; and wherein the map manager module is further executed by the one or more processors to update the transit label:
   to include a representation of a second transit route feature of a plurality of transit route features, the second transit route feature having a transit stop at the transit location within the selected time period, and
   to exclude transit route features of the plurality of transit route features that do not have a transit stop at the transit location within the selected time period.

14. The system of claim 8, wherein the road feature is represented in the transit map based on the transit layer style, and wherein a second road feature that does not intersect the plurality of transit route features is represented in the transit map based on the road layer style.

15. A non-transitory computer readable medium having computer-executable program instructions embodied therein that when executed cause a computer processor to:
   obtain a plurality of transit route features;
   perform a spatial comparison of a first transit route feature of the plurality of transit features with a road spatial data layer;
   modify a transit location of the first transit route feature to intersect a road feature of the road spatial data layer based on the spatial comparison;
   obtain a road layer style for the road spatial data layer;
   determine a transit layer style for the first transit route feature based on the road layer style; and
   generate, based on the transit layer style, a transit map such that a transit label for the first transit route feature is contained by the road feature.

16. The computer readable medium of claim 15, the computer-executable program instructions further causing the computer processor to:
   determine a rank for each of the plurality of transit route features at the transit location based on a frequency of transit stops of each of the plurality of transit route features.

17. The computer readable medium of claim 16, wherein the transit label comprises a representation of the first transit route feature, the first transit route feature having a greater frequency of transit stops than a second transit route feature of the plurality of transit route features, and wherein the transit label excludes the second transit route feature.

18. The computer readable medium of claim 16, wherein the transit label comprises a first representation of the first transit route feature and a second representation of a second transit route feature of the plurality of transit route features, wherein the first representation is presented before the second representation in the transit label based on the first transit route feature having a greater frequency of transit stops than the second transit route feature.

19. The computer readable medium of claim 15, the computer-executable program instructions further causing the computer processor to:
   receive a request to filter the transit map, the request to filter comprising a selected transit route feature of the plurality of transit route features; and
   update the transit label to include a representation of the selected transit route feature and to exclude unselected transit route features of the plurality of transit route features.

20. The computer readable medium of claim 15, the computer-executable program instructions further causing the computer processor to:
   receive a request to filter the transit map, the request to filter comprising a selected time period for the transit location; and
   update the transit label:
      to include a representation of a second transit route feature of the plurality of transit route features, the second transit route feature having a transit stop at the transit location within the selected time period, and
      to exclude transit route features of the plurality of transit route features that do not have a transit stop at the transit location within the selected time period.

21. The computer readable medium of claim 15, wherein the road feature is represented in the transit map based on the transit layer style, and wherein a second road feature that does not intersect the plurality of transit route features is represented in the transit map based on the road layer style.

* * * * *